United States Patent
Bringuel et al.

(10) Patent No.: US 7,266,451 B2
(45) Date of Patent: Sep. 4, 2007

(54) SHOCK RESISTANT DEVICE

(75) Inventors: Martin Clarence Bringuel, San Jose, CA (US); Shelomon Patrick Doblack, Santa Clara, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 294 days.

(21) Appl. No.: 10/799,012

(22) Filed: Mar. 11, 2004

(65) Prior Publication Data
US 2005/0216192 A1   Sep. 29, 2005

(51) Int. Cl.
*G01C 21/00* (2006.01)
(52) U.S. Cl. .................. 701/213; 701/50; 361/761
(58) Field of Classification Search ............ 361/340, 361/384, 390, 391, 380, 415, 429, 761; 701/50, 701/200, 213; 174/4.5; 37/241, 271, 408
See application file for complete search history.

(56) References Cited

U.S. PATENT DOCUMENTS

| | | | |
|---|---|---|---|
| 4,891,734 A | 1/1990 | More et al. | |
| 4,985,804 A * | 1/1991 | Campbell et al. | ........... 361/687 |
| 5,282,114 A * | 1/1994 | Stone | ........... 361/687 |
| 5,631,658 A | 5/1997 | Gudat et al. | |
| 5,862,501 A | 1/1999 | Talbot et al. | |
| 2005/0190056 A1* | 9/2005 | Lacy et al. | ........... 340/539.11 |

FOREIGN PATENT DOCUMENTS

| | | |
|---|---|---|
| EP | 1 122 458 A | 8/2001 |
| EP | 1 292 178 A | 3/2003 |

* cited by examiner

*Primary Examiner*—Gertrude A. Jeanglaude

(57) ABSTRACT

A shock resistant device. A printed circuit board comprising electronics and a frequency reference is rigidly mounted to a central support member. The electronics can be mounted to both surfaces of the printed circuit board. The central support member is mounted to an enclosure via wire rope isolators. The central support member is designed to maximize rigidity at minimum mass. The central support member can comprise a thin wall metal mesh or honeycomb. At least a portion of the central support member directly contacts the printed circuit board beneath the frequency reference.

26 Claims, 5 Drawing Sheets

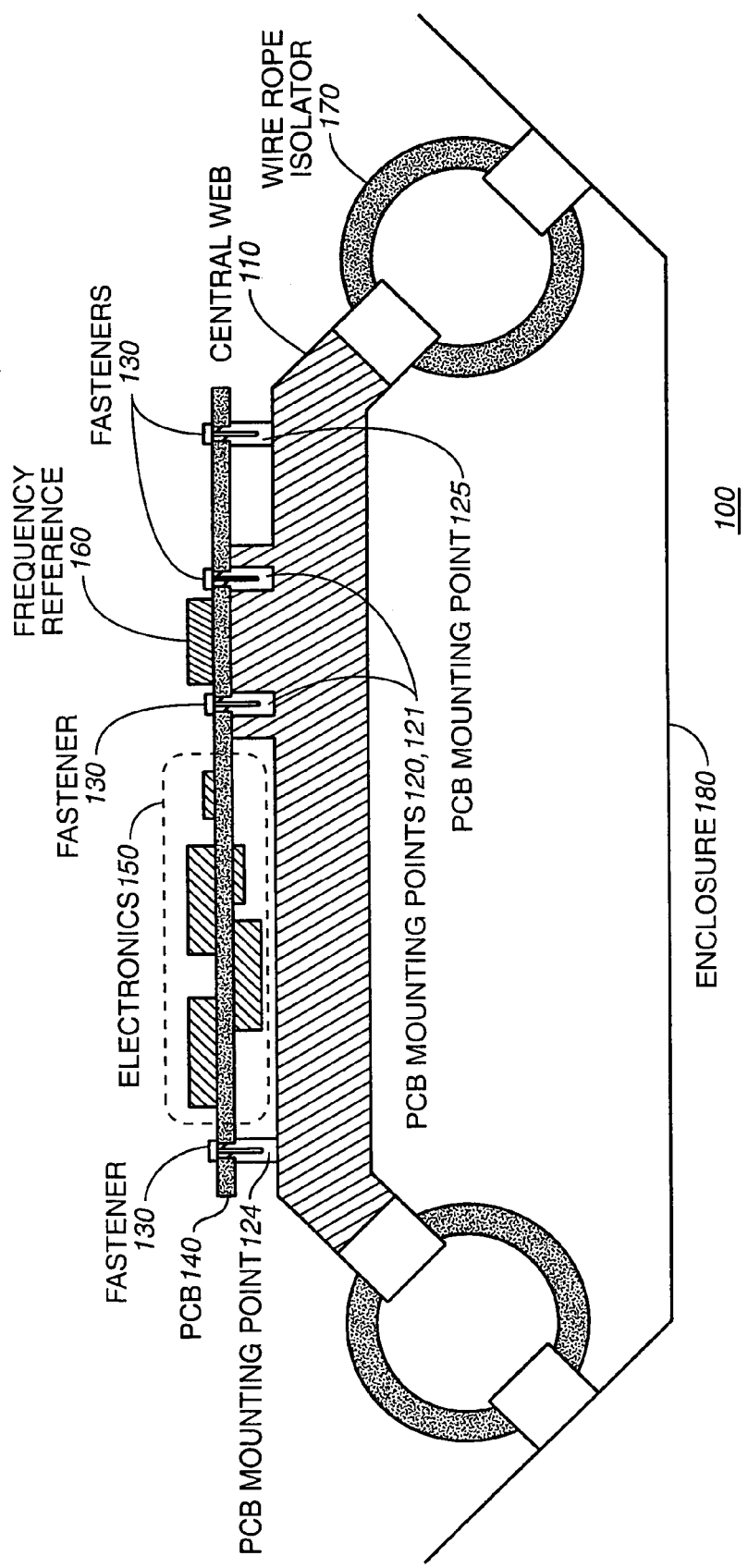
FIG._1

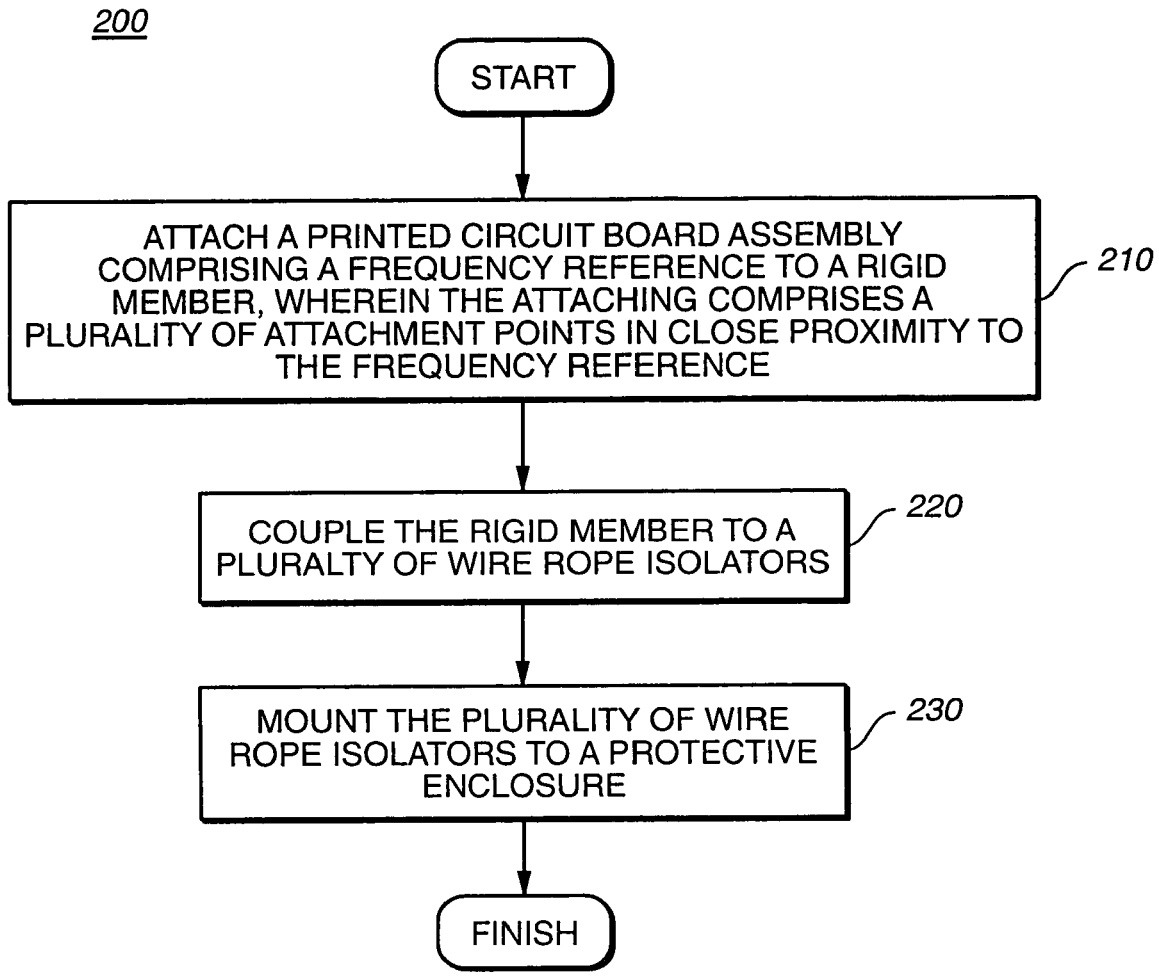
FIG._2

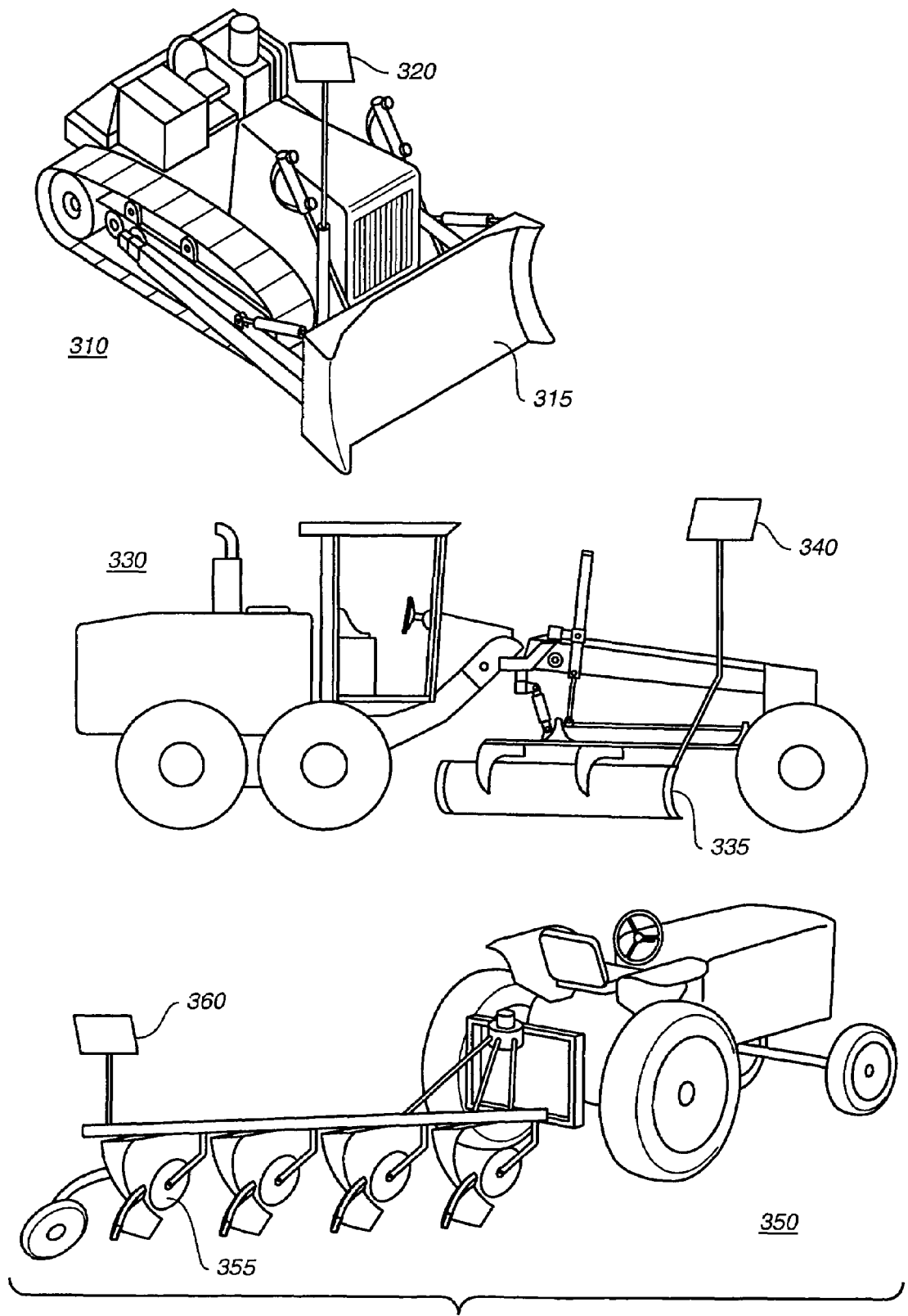
FIG._3A

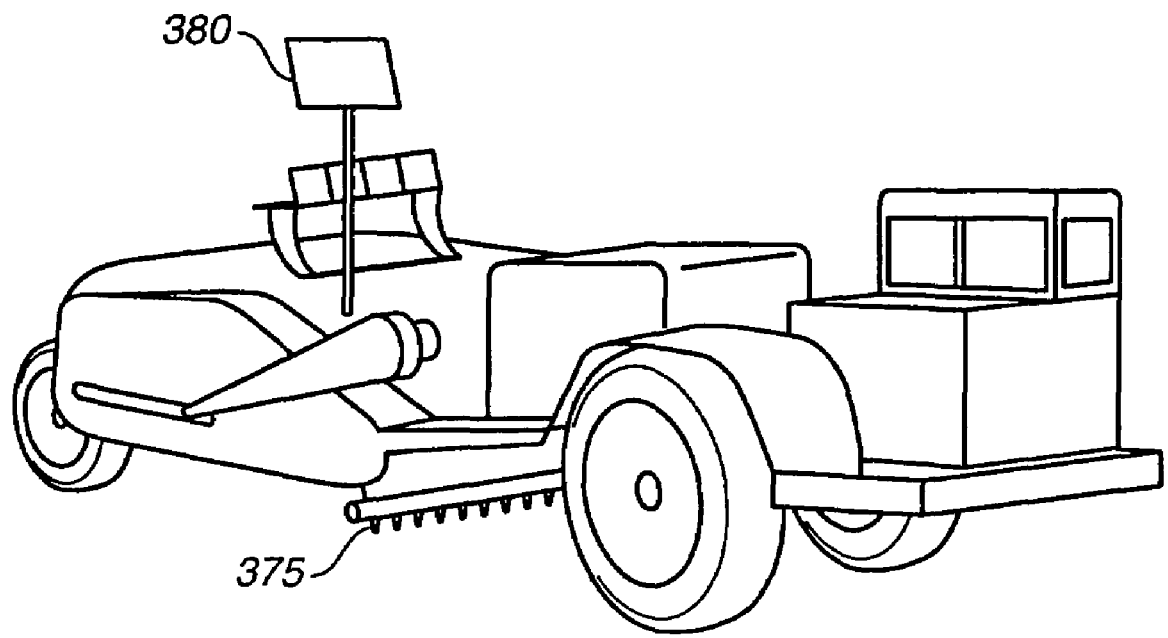
FIG._3B

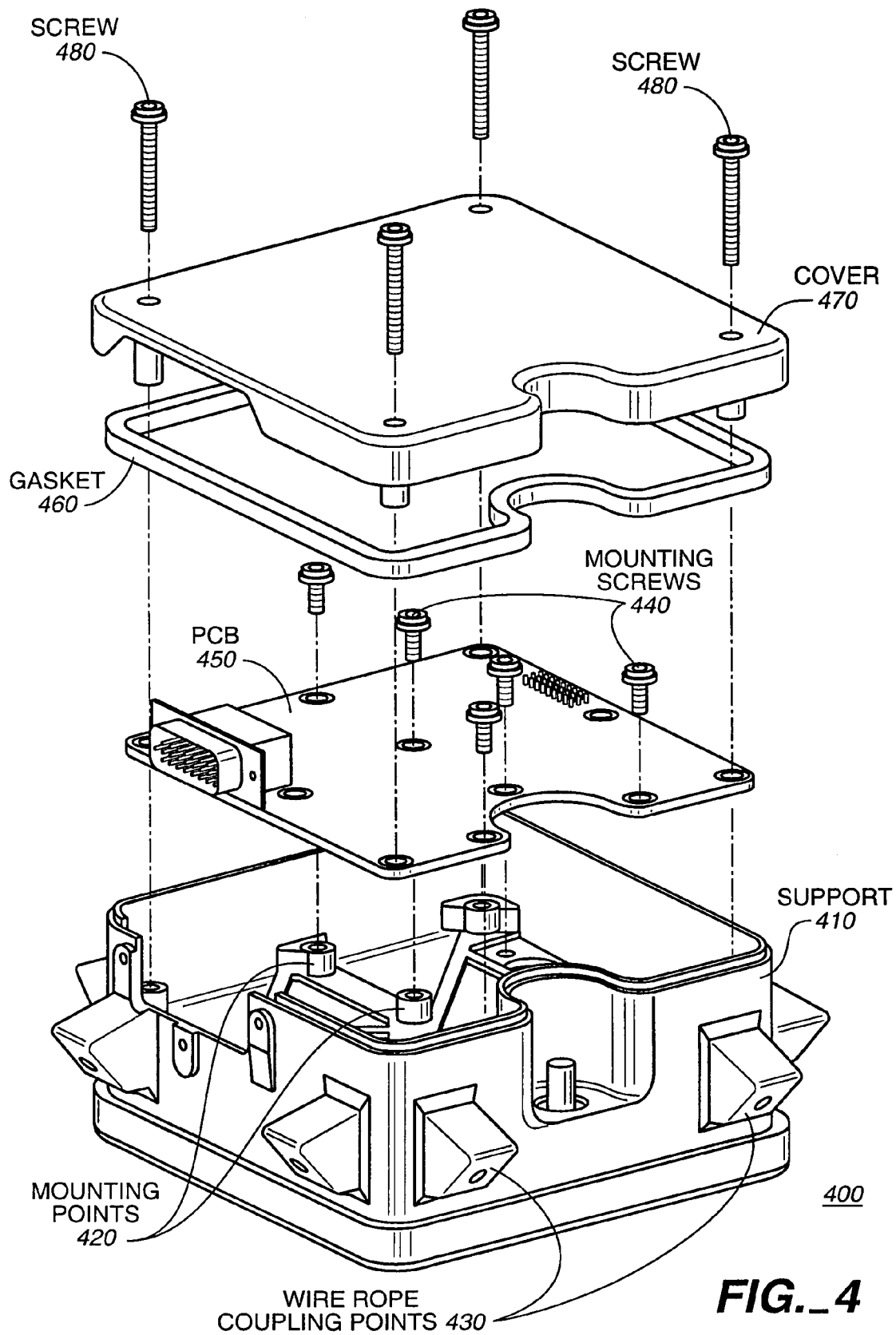
FIG._4

SHOCK RESISTANT DEVICE

FIELD OF THE INVENTION

Embodiments in accordance with the present invention relate to operating electronic devices in extremely high shock and vibration environments.

BACKGROUND

Use of the global positioning system (GPS) has enabled the earth moving industry to be far more precise in constructing, for example, roads, building foundations and open mines. Global positioning system receivers, e.g., electronics capable of receiving and processing global positioning system radio signals to determine a position on the Earth, are frequently placed on earth moving equipment, for example, bull dozers, graders, plows, excavators and the like. Global positioning system receivers commonly record positions for such earth moving equipment. It is becoming more common for global positioning system receivers to guide earth moving equipment to predetermined positions. The Site Vision Automatic Grade Control System, commercially available from Trimble Navigation Limited of Sunnyvale, Calif. is an example of such systems.

A GPS system generally determines the position of the receiving antenna. As the blade of earth moving equipment is responsible for moving dirt and rocks, it is desirable to locate the antenna on the blade. Conventional GPS systems for bladed earth moving equipment generally comprise an antenna mounted on a mast, e.g., 1.5 meters in length, mounted to and rising above the earth moving blade. The mast enables improved reception of the GPS radio signals, as well as moving the antenna equipment out of the way of most debris thrown off by the earth moving operations.

The GPS receiver electronics for such systems are conventionally placed elsewhere on the earth moving equipment, for example on an engine cover or in the cab area. More specifically, in the conventional art, the GPS receiver electronics cannot be mounted on the blade attached mast, due to the extreme shock and vibration conditions of such blades.

The blades of earth moving equipment comprise one of the most violent shock and vibration environments known to man. Such blades typically endure accelerations of 50 to over 900 times the acceleration of gravity in multiple axes virtually constantly. In addition, the blades are subject to constant vibration over a wide spectrum of frequencies. Further, the mast generally contributes some multiplicative acceleration due to its length and slight bending. In general, electronic assemblies, e.g., integrated circuits and discrete components mounted on a printed circuit board, cannot survive such shock and vibration conditions. For example, integrated circuit pins can be lifted from a printed circuit board, and traces within a printed circuit board can be broken, rendering the electronic assembly non functional.

In addition, radio frequency receivers, e.g., a global positioning system receiver, typically require a highly precise and stable frequency reference. In most cases, a quartz crystal is utilized in such applications as it has desirable precision and stability characteristics. However, quartz crystals rely upon resonant mechanical movements of the crystal to achieve electrical oscillations due to the piezo-electric effect. Shock and vibration conditions common to earth moving blades can easily upset the motions of a crystal frequency reference, resulting in deleterious frequency changes or breakage, rendering the receiver inoperative.

For these reasons and others, GPS receiver electronics are conventionally not mounted to the blades of earth moving equipment. Rather, GPS receiver electronics are conventionally mounted on an engine cover or in the cab area of the earth moving equipment. A blade mounted antenna is typically coupled to receiver electronics via a radio frequency (RF) cable.

RF cabling, e.g., coaxial cable, running from a separate antenna to receiver electronics, inherently attenuates a received signal and is susceptible to induced noise. As an unfortunate consequence, received signal quality at the separated receiver is degraded from that received at the antenna and less than desired.

In addition, such RF cabling is exposed to a severe environment, including dirt, rocks and other debris flying over the top of a blade. Further, both ends of the cable, e.g., the blade mounted antenna and receiver electronics mounted elsewhere, are subject to shock and vibration, inducing a variety of mechanical stresses on such cabling. RF connectors, designed to achieve a constant impedance when coupling RF cabling to antennas and/or receiver electronics, are especially fragile. Such cabling and connector systems are subject to frequent damage, incurring not only direct repair costs, but also significant financial losses due to lack of productivity for an expensive piece of earth moving equipment and valuable operator while awaiting repair.

Thus, it has been a lot felt and unresolved need to mount global positioning system electronics directly to the blades of earth moving equipment. In addition, it is desirable to mount a receiving antenna directly to such global positioning system electronics. Further, it is desirable to meet the above-mentioned needs in a manner that is compatible and complimentary with existing designs for global positioning system electronics.

SUMMARY OF THE INVENTION

Embodiments in accordance with the present invention provide for mounting global positioning system electronics directly to the blades of earth moving equipment. Additional embodiments provide for mounting a receiving antenna directly to such global positioning system electronics. Further embodiments provide for the above-mentioned needs in a manner that is compatible and complimentary with existing designs for global positioning system electronics.

A shock resistant device is disclosed. A printed circuit board comprising electronics and a frequency reference is rigidly mounted to a central support member. The electronics can be mounted to both surfaces of the printed circuit board. The central support member is mounted to an enclosure via wire rope isolators. The central support member is designed to maximize rigidity at minimum mass. The central support member can be solid or comprise a thin wall metal mesh or honeycomb. At least a portion of the central support member directly contacts the printed circuit board beneath the frequency reference.

BRIEF DESCRIPTION OF THE DRAWINGS

FIG. 1 illustrates a side sectional view of a shock resistant device, in accordance with embodiments of the present invention.

FIG. 2 is a flow chart for a method 200 of manufacturing a shock resistant device, in accordance with embodiments of the present invention.

FIGS. 3A and 3B illustrates several exemplary types of bladed earth-moving equipment that may utilize embodiments in accordance with the present invention.

FIG. 4 illustrates an exemplary assembly, in accordance with embodiments of the present invention.

DETAILED DESCRIPTION OF THE INVENTION

In the following detailed description of the present invention, shock resistant device, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Embodiments in accordance with the present invention are described in the context of design and operation of electronic assemblies. More particularly, embodiments in accordance with the present invention related to operating electronics in extreme shock and vibration conditions.

The blades of earth moving equipment, e.g., a "bull" dozer, comprise one of the most violent shock and vibration environments known to man. Such blades typically endure accelerations of 50 to over 900 times the acceleration of gravity in multiple axes virtually constantly. Such g forces are deleterious to the operation of conventional electronics, particularly frequency references as are commonly used for digital electronics, e.g., microprocessors, and radio frequency receivers.

It is frequently desirable to operate electronics in general at less than 100 gs. Critically, for successful operation of a frequency reference utilized in a high performance radio receiver, frequency components of shock and vibration should be reduced by at least four orders of magnitude relative to the fundamental frequency. For example, shock and vibration to a 10 MHz crystal should be dampened to comprise frequency components less than about 1000 Hz.

FIG. 1 illustrates a side sectional view of a shock resistant device 100, in accordance with embodiments of the present invention. Shock resistant device 100 is designed to reduce shock and vibration, e.g., of an earth moving equipment blade, applied at enclosure 180 to levels that are compatible with the operation of electronic assemblies contained within enclosure 180, e.g., a global positioning receiver.

Shock resistant device 100 comprises central support member 110. Central support member 110 supports printed circuit board (PCB) 140. Printed circuit board 140 mounts and intercouples electronics 150, e.g., integrated circuits and discrete components, and frequency reference 160. Electronics 150 and frequency reference 160 can be mounted to printed circuit board 140 in a variety of well known manners, including pin through hole and surface mount technologies (SMT). In accordance with embodiments of the present invention, electronics 150 can be mounted to both top and bottom surfaces of printed circuit board 140.

It is desirable for central support member 110 to be rigid, e.g., to be very rigid, to have great resistance to flexure and to resist fatigue. At the same time, however, it is also desirable for central support member 110 to comprise as little mass as possible. In accordance with embodiments of the present invention, central support member 110 is well suited to being formed from die-cast aluminum comprising a web-like construction to reduce mass and maintain strength. In accordance with other embodiments of the present invention, a non-solid structure can be utilized for central support member 110, e.g., a mesh or honeycomb structure of lightweight metal, e.g., thin wall aluminum. It is appreciated that other types of structures can be utilized for central support member 110, for example trusses and composite expansions.

Printed circuit board 140 is unconventionally thick. For example, whereas conventional multi-layer printed circuit board utilized in a wide variety of electronic assemblies may be 0.065 inches thick, PCB 140 is substantially thicker, e.g., 0.093 inches thick. Such thickness contributes to greater resistance of the printed circuit board to flexure.

Printed circuit board 140 is mounted to central support member 110 using well know methods of mounting printed circuit boards, for example via the use of machine screws or thread forming screws, e.g., fasteners 130, through mounting holes of PCB 140 into central support member 110, at a plurality of mounting points 124, 125. PCB 140 is also well suited to mounting to central support member 110 via stand-offs for the plurality of mounting points 124, 125. Separation between central support member 110 and portions of printed circuit board 140 advantageously enables electronics 150 to be mounted to both sides of PCB 140. It is appreciated that such a double sided printed circuit board is generally smaller, e.g., comprises less volume, than a single sided printed circuit board, thereby reducing printed circuit board mass and further reducing size and mass required for central support member 110.

Frequency reference 160 is a critical component for the function of shock resistant device 100. In most cases, a quartz crystal is utilized in such applications as it has desirable precision and stability characteristics. It is appreciated that quartz crystals rely upon resonant mechanical movements of the crystal to achieve electrical oscillations due to the piezo-electric effect. Severe shock and vibration environments can easily upset the motions of a crystal frequency reference, resulting in deleterious frequency changes or breakage, rendering the receiver inoperative. For example, shock and vibration can cause harmful phase noise in frequency reference 160, resulting in functional failures of a radio receiver.

It is to be appreciated that even a thick printed circuit board will flex under severe shock and vibration loads. As discussed above, such flexure is deleterious to the operation of frequency reference 160. To further reduce flexure in a critical portion of PCB 140, in accordance with embodiments of the present invention there is no gap between central support member 110 and printed circuit board 140 in the region of frequency reference 160. For example, central support member 110 and printed circuit board 140 are in direct contact. In addition, a plurality of fasteners 130 and PCB mounting points 120, 121 rigidly secure the portion of PCB 140 in the region of frequency reference 160 to central support member 110. In accordance with embodiments of the present invention, rigidly coupling frequency reference 160 to central support member 110 further limits flexure of PCB 140 in that region, thereby beneficially dampening mechanical energy coupling into frequency reference 160.

It is to be appreciated that additional circuit board(s) can be mounted to the opposite face of central support member 110, and such electronics can be coupled together there through, in accordance with embodiments of the present invention.

A plurality, e.g., four, of wire rope isolators, e.g., wire rope isolator 170, couples central support member 110 to enclosure 180. Wire rope isolators should be specifically tuned to the shock and vibration environment of enclosure 180. In addition, it is desirable to limit the transient displacement of wire rope isolators, as displacement impacts the functional lifetime of wire rope isolators.

Wire rope isolators dampen shock and vibration and actually absorb some energy of such events, converting the kinetic energy of shock and vibration to heat. Wire rope isolators are typically specified by suspended mass and desired (or allowable) displacement of the suspended mass in three dimensions under the shock and vibration conditions. Typical parameters for wire rope isolators include coil diameter, number of coils and diameter of rope. The coil diameter is desirably selected such that maximum displacement of the system is less than half of the maximum displacement of the individual wire rope isolators. It is to be appreciated that small displacements are associated with longer wire rope isolator functional lifetimes, and also beneficially contribute to a smaller overall size for shock resistant device 100. The number of coils and rope diameter are determined to minimize specific shock and vibration conditions.

The isolation system of shock resistant device 100 should handle shocks in all three dimensions, as a three dimensional shock and vibration environment is characteristic of earth moving equipment. Typical spring constants of wire rope isolators for roll and sheer forces are similar. Typical spring constants of wire rope isolators for compression are generally significantly greater than those for roll and/or sheer. Generally, such different spring constants make wire rope isolators difficult to design for three dimensional shock and vibration conditions. However, when mounted at about 45 degrees to the suspended mass, the effective spring constants for all three motions (axes) relative to the suspended mass are very similar. Mounting at about 45 degrees to the suspended mass eases the design of the wire rope isolators and also contributes to extending their life, as the displacement is more uniform among the three dimensions.

Global positioning antennas generally require shock mounting when mounted on an earth moving equipment blade, or mast mounted on a blade. A significant source of antenna-related failure results from antenna movement, rather than mechanical failure. If a global positioning antenna moves too far too fast, e.g., 10 cm in one quarter second, GPS tracking may be lost and a position cannot be determined for a period of time.

Global positioning antennas can be mounted directly to enclosure 180, for example via conventional elastomeric dampening systems. Frequently, however, because of the mass of global positioning antennas comprising ground planes and the desire to elevate such antennas, GPS antennas can be located a small distance from enclosure 180, for example on a mast attached to a blade. Even though such an arrangement requires an RF cable, the capability to mount receiver electronics in enclosure 180 on, or coupled directly to the blade, is desirable over the conventional art. For example, the cable can be shorter than in the conventional art, reducing attenuation and induced noise. In addition, the cable can be more heavily armored, as it need not be as flexible. Further, the cable could be contained substantially with a sturdy structural member, e.g., a blade mounted mast.

FIG. 2 is a flow chart for a method 200 of manufacturing a shock resistant device, in accordance with embodiments of the present invention. In block 210, a printed circuit board assembly is attached to a rigid member, for example central web 110 of FIG. 1. The printed circuit board assembly can be attached to the rigid member in a variety of well known manners, for example, via screws or with adhesives. The attachment includes a plurality of attachment points in close proximity to a frequency reference, e.g., a crystal, of the printed circuit board assembly.

In block 220, the rigid member is attached to a plurality of wire rope isolators, for example, wire rope isolator 170. In block 230, the plurality of wire rope isolators are attached to a protective enclosure, for example a metal enclosure designed to protect the printed circuit board assembly from dirt and/or moisture.

In accordance with embodiments of the present invention, the wire rope isolators should be mounted at an angle to the plane of the printed circuit board assembly, for example, at about 45 degrees to that plane. FIG. 3 illustrates several exemplary types of bladed earth-moving equipment that may utilize embodiments in accordance with the present invention. Item 310 is a dozer or "bull" dozer. Dozers are well known and commercially available from a variety of companies, for example, Caterpillar Inc., of Peoria, Ill. A dozer is typically a tracked vehicle comprising a hydraulically actuated earth-moving blade 315. It is appreciated that embodiments in accordance with the present invention are well suited to alternative configurations of dozers.

Earth-moving blade 315 is subject to extreme shock and vibration, as it contacts soil and rocks. Such blades typically endure accelerations of 50 to over 900 times the acceleration of gravity in multiple axes virtually constantly.

Dozer 310 further comprises global positioning system receiver 320, mounted on a mast to earth-moving blade 315. Global positioning system receiver 320 is subject to substantially the same shock and vibration forces as earth-moving blade 315.

Item 330 illustrates a grader or road grader. Graders are well known and commercially available from a variety of companies, for example, Caterpillar Inc., of Peoria, Ill. Graders are also frequently employed as snow plows. A grader is typically a wheeled vehicle comprising a hydraulically actuated earth-moving blade 335. It is appreciated that embodiments in accordance with the present invention are well suited to alternative configurations of graders.

Grader 330 further comprises global positioning system receiver 340, mounted on a mast to earth-moving blade 335. Global positioning system receiver 340 is subject to substantially the same shock and vibration forces as earth-moving blade 335.

Item 350 illustrates a plow. It is appreciated that plows are commercially available in a wide variety of configurations, including self propelled and towed, and that embodiments in accordance with the present invention are well suited to a wide variety of such configurations.

Plow 350 comprises a plurality of earth-moving blades, e.g., earth-moving blade 355. Plow 350 further comprises global positioning system receiver 360, mounted on a mast coupled to earth-moving blade 335. Global positioning system receiver 340 is subject to substantially the same shock and vibration forces as earth-moving blade 355.

Referring now to FIG. 3B, item 370 illustrates a scrapper. Scrappers are well known and commercially available from a variety of companies, for example, Caterpillar Inc., of Peoria, Ill. A grader is typically an articulated wheeled vehicle comprising a series of earth-moving blades, for example earth-moving blade 375. It is appreciated that embodiments in accordance with the present invention are well suited to alternative configurations of graders.

Scraper 370 further comprises global positioning system receiver 380, mounted on a mast coupled to earth-moving blade 375. Global positioning system receiver 380 is subject to substantially the same shock and vibration forces as earth-moving blade 375.

FIG. 4 illustrates an exemplary assembly 400, in accordance with embodiments of the present invention. Assembly 400 comprises a support member 410 comprised of die-cast aluminum. Member 410 is similar in function to central web 110 of FIG. 1. More specifically, member 410 comprises a plurality of PCB mounting points 420 which are similar in function to PCB mounting points 120, 121, 124 and 125 of FIG. 1.

Member 410 is further adapted to couple to wire rope isolators at about a 45 degree angle. Wire rope coupling points 430 are disposed to couple to a plurality of wire rope isolators.

A printed circuit board 450 is mounted to member 410 utilizing mounting screws 440. Printed circuit board 450 is similar to printed circuit board 140 of FIG. 1. Cover 470 is coupled to member 410 via screws 480. Gasket 460 fills any gaps between cover 470 and member 410. Cover 470 is well suited to the use of materials and construction processes similar to those utilized for support member 410 and as described for central web 110 of FIG. 1.

It is to be appreciated that assembly 400, comprising cover 470, gasket 460 and support member 410, can form a sealed enclosure for PCB 450 and its associated electronics. More particularly, assembly 400 can form a seal against environment hazards, e.g., dust or corrosive gasses. In addition, assembly 400 can provide significant radio frequency shielding. Such shielding can resist the radiated emissions from the device electronics, as well as protecting the electronics from external electromagnetic energy that may interfere with the operation of the device electronics.

Embodiments in accordance with the present invention provide for mounting global positioning system electronics directly to the blades of earth moving equipment. Additional embodiments provide for mounting a receiving antenna directly to such global positioning system electronics. Further embodiments provide for the above-mentioned needs in a manner that is compatible and complimentary with existing designs for global positioning system electronics.

Embodiments in accordance with the present invention, shock resistant device, are thus described. While the present invention has been described in particular embodiments, it should be appreciated that the present invention should not be construed as limited by such embodiments, but rather construed according to the below claims.

What is claimed is:

1. A shock mounted electronics system comprising:
   a support member operative to resist flexure;
   an electronics assembly comprising a frequency reference;
   a plurality of wire rope isolators coupling said support member to an enclosure; and
   wherein said support member is rigidly coupled to that portion of said electronics assembly comprising said frequency reference.

2. The apparatus of claim 1 wherein said support member comprises die cast aluminum.

3. The apparatus of claim 1 wherein said support member comprises a non-solid metal construction.

4. The apparatus of claim 1 wherein said frequency reference comprises a quartz crystal.

5. The apparatus of claim 1 wherein said electronics assembly comprises a radio frequency receiver.

6. The apparatus of claim 4 wherein said electronics assembly comprises a global positioning system receiver.

7. The apparatus of claim 1 wherein said wire rope isolators are mounted at about 45 degrees to the plane of said electronics assembly.

8. The apparatus of claim 1 wherein said electronics assembly comprises components mounted on both surfaces of a printed circuit board.

9. The apparatus of claim 1 operating rigidly mounted to a blade of an earth moving equipment.

10. The apparatus of claim 1 wherein said electronics assembly comprises a printed circuit board of greater than about 0.075 inches.

11. The apparatus of claim 10 wherein said support member is an integral component of a radio frequency shielding system.

12. A support member for mounting an electronics assembly in a severe shock and vibration environment comprising:
   a plurality of first mounting points to couple to wire rope isolators;
   a plurality of second mounting points to couple to a printed circuit board;
   wherein at least two of said plurality of second mounting points are in close proximity to a frequency reference mounted to said printed circuit board; and
   wherein at least a portion of said support member directly contacts said printed circuit board under said frequency reference.

13. The apparatus of claim 12 wherein said printed circuit board comprises components on both surfaces.

14. The apparatus of claim 12 wherein said frequency reference comprises a quartz crystal.

15. The apparatus of claim 12 wherein said first mounting points are at about 45 degrees to the plane of said printed circuit board.

16. The apparatus of claim 12 wherein said support member comprises die cast aluminum.

17. The apparatus of claim 12 wherein said support member comprises a non-solid metal structure.

18. The apparatus of claim 16 wherein said non-solid metal structure comprises aluminum.

19. The apparatus of claim 12 wherein said support member is an integral component of a radio frequency shielding system.

20. A method of manufacturing a shock resistant device comprising:
   attaching a printed circuit board assembly comprising a frequency reference to a rigid member, wherein said attaching comprises a plurality of attachment points in close proximity to said frequency reference;
   coupling said rigid member to a plurality of wire rope isolators; and
   mounting said plurality of wire rope isolators to a protective enclosure.

21. A method as described in claim 20 wherein said printed circuit board assembly comprises electronic components on first and second surfaces of said printed circuit board assembly.

22. A method as described in claim 20 wherein said rigid member is an integral component of a radio frequency shielding system.

23. A method as described in claim 20 wherein said printed circuit board assembly is directly contacted by said rigid member opposite said frequency reference.

24. A method as described in claim 20 wherein said rigid member comprises a non-solid metal construction.

25. A method as described in claim 20 wherein said printed circuit board assembly comprises a radio frequency receiver.

26. A method as described in claim 20 wherein said rigid member comprises die cast aluminum.

* * * * *